(12) United States Patent
Alphenaar et al.

(10) Patent No.: US 8,842,874 B1
(45) Date of Patent: Sep. 23, 2014

(54) METHOD AND SYSTEM FOR DETERMINING AN AMOUNT OF A LIQUID ENERGY COMMODITY STORED IN A PARTICULAR LOCATION

(75) Inventors: Deirdre Alphenaar, Prospect, KY (US); Walter F. Jones, Crestwood, KY (US)

(73) Assignee: Genscape Intangible Holding, Inc., Louisville, KY (US)

( * ) Notice: Subject to any disclaimer, the term of this patent is extended or adjusted under 35 U.S.C. 154(b) by 774 days.

(21) Appl. No.: 13/089,674

(22) Filed: Apr. 19, 2011

Related U.S. Application Data

(60) Provisional application No. 61/325,678, filed on Apr. 19, 2010.

(51) Int. Cl.
*G06K 9/00* (2006.01)

(52) U.S. Cl.
USPC .......................................... 382/100; 382/141

(58) Field of Classification Search
CPC .......... G06K 9/00624; G06K 9/00771; G06K 9/00536; G01F 23/20; G01F 23/00
See application file for complete search history.

(56) References Cited

U.S. PATENT DOCUMENTS

| | | | | | |
|---|---|---|---|---|---|
| 3,225,191 | A | * | 12/1965 | Calhoun | 250/338.1 |
| 3,842,894 | A | * | 10/1974 | Southworth et al. | 164/453 |
| 3,935,741 | A | * | 2/1976 | Zinsmeyer et al. | 73/313 |
| 4,202,398 | A | * | 5/1980 | Osugi | 164/151.3 |
| 4,523,460 | A | * | 6/1985 | Strickler et al. | 73/200 |
| 4,672,842 | A | * | 6/1987 | Hasselmann | 73/49.2 |
| 4,733,095 | A | * | 3/1988 | Kurahashi et al. | 250/577 |
| 4,827,762 | A | * | 5/1989 | Hasselmann | 73/49.2 |
| 5,265,032 | A | * | 11/1993 | Patel | 702/188 |
| 5,363,093 | A | * | 11/1994 | Williams et al. | 340/605 |
| 5,400,253 | A | * | 3/1995 | O'Connor | 701/123 |
| 5,610,611 | A | * | 3/1997 | McEwan | 342/89 |
| 5,648,844 | A | * | 7/1997 | Clark | 356/5.09 |
| 5,757,664 | A | * | 5/1998 | Rogers et al. | 700/232 |
| 5,973,770 | A | * | 10/1999 | Carter et al. | 356/4.09 |
| 6,012,020 | A | * | 1/2000 | Gardell et al. | 702/50 |
| 6,036,296 | A | * | 3/2000 | Axtell et al. | 347/7 |
| 6,098,029 | A | * | 8/2000 | Takagi et al. | 702/127 |
| 6,259,516 | B1 | * | 7/2001 | Carter et al. | 356/442 |
| 6,336,362 | B1 | * | 1/2002 | Duenas | 73/313 |
| 6,374,187 | B1 | * | 4/2002 | Knight et al. | 702/51 |
| 6,771,058 | B2 | | 8/2004 | Lapinksi et al. | |
| 6,956,364 | B2 | | 10/2005 | Staats | |
| 7,228,199 | B2 | * | 6/2007 | Wallace | 700/236 |
| 7,663,130 | B1 | | 2/2010 | Yarbrough et al. | |
| 8,473,227 | B2 | * | 6/2013 | Olson et al. | 702/55 |
| 8,502,685 | B2 | * | 8/2013 | McFeeters | 340/584 |
| 2005/0240348 | A1 | * | 10/2005 | Knight et al. | 702/2 |
| 2006/0293872 | A1 | * | 12/2006 | Zamora et al. | 703/10 |
| 2011/0175739 | A1 | * | 7/2011 | McFeeters | 340/584 |
| 2011/0270611 | A1 | * | 11/2011 | Nishimura et al. | 704/246 |
| 2012/0281096 | A1 | * | 11/2012 | Gellaboina et al. | 348/163 |

* cited by examiner

*Primary Examiner* — Manav Seth

(74) *Attorney, Agent, or Firm* — Stites & Harbison, PLLC; David W. Nagle, Jr.

(57) ABSTRACT

A method for determining an amount of a liquid energy commodity stored in a tank comprises the steps of: receiving, at a central processing facility, volume capacity information associated with the tank and storing the volume capacity information in a database; receiving, at the central processing facility, one or more images of the tank; analyzing the one or more images of the tank to determine a liquid level for the tank; calculating the amount of the liquid energy commodity in the tank based on the determined liquid level and the volume capacity information retrieved from the database; and communicating information about the amount of the liquid energy commodity in the tank to a third-party market participant.

30 Claims, 10 Drawing Sheets

METHOD AND SYSTEM FOR DETERMINING AN AMOUNT OF A LIQUID ENERGY COMMODITY STORED IN A PARTICULAR LOCATION

CROSS-REFERENCE TO RELATED APPLICATIONS

The present application claims priority to U.S. Provisional Patent Application Ser. No. 61/325,678 filed on Apr. 19, 2010, the entire disclosure of which is incorporated herein by reference.

BACKGROUND OF THE INVENTION

The present invention relates to determining an amount of crude oil or similar liquid energy commodity that is stored in a particular location, such as tank farm or storage hub.

Liquid energy commodities, such as crude oil, comprise a multi-billion dollar economic market. These commodities are bought and sold by many parties, and as with any traded market, information about the traded commodities is very valuable to market participants. Specifically, the operations of the various components and facilities of the production, transportation, storage, and distribution systems for each of these commodities can have significant impacts on the price and availability of these commodities, making information about said operations valuable. Furthermore, such information generally is not disclosed publicly by the various component and facility owners or operators, and access to said information is therefore limited.

For example, crude oil is typically stored in large, above-ground tanks A collection of such above-ground tanks at a particular location is often referred to as a "tank farm." To the extent that a collection of such above-ground tanks is located near the intersection of many outgoing and incoming pipelines, it may also be referred to as a "storage hub." Similarly, other liquid energy commodities of interest, including natural gas liquid derivatives (or condensates) and refined petroleum products (such as diesel, gasoline, and fuels oils) may also be stored in such above-ground tanks on a tank farm or at a storage hub.

In any event, whether crude oil or other liquid energy commodity, activity at tank farms or storage hubs is of interest to market participants.

SUMMARY OF THE INVENTION

The present invention is a method and system for determining an amount of crude oil or similar liquid energy commodity that is stored in a particular location, such as tank farm or storage hub.

In accordance with the method and system of the present invention, each tank in a particular location is researched using publicly available resources or visual inspection, and all relevant information about each tank, including volume capacity information, tank type (i.e., floating roof or fixed roof), physical dimensions, emissions data and/or any other information contained in tank construction and safety permits, is stored in a database at a central processing facility.

On a predetermined schedule, an inspection of each tank at the particular location is conducted. Such an inspection includes the collection of one or more photographic images (i.e., visible spectrum) or video of each tank, the collection of infrared images or video of each tank, and/or the collection of other types of images of each tank. The collected images of each tank are then transmitted to a central processing facility and stored in a database.

At the central processing facility, an analysis of the collected images is conducted, which allows for a calculation of the amount of crude oil in each tank.

With respect to the analysis of a tank with an external floating roof (EFR), one preferred form of analysis is to determine the height of the roof relative to the top of the selected tank using standard image pixel number determination techniques. Based on the determined height of the roof (which is indicative of the liquid level) and the volume capacity information and/or the physical dimensions of the selected tank stored in the database at the central processing facility, the amount of crude oil in the tank can be calculated.

With respect to the analysis of a tank with an external floating roof (EFR), another preferred form of analysis is an image processing analysis to model the top, roof, and base of a tank as parallel elliptical planes and to determine the roof height by calculating the separation distance between these elliptical planes. Based on the determined height of the roof relative to the base and/or the top of the tank (which again is indicative of the liquid level) and the volume capacity information and/or the physical dimensions of the selected tank stored in the database at the central processing facility, the amount of crude oil in the tank again can be calculated.

Various other methods or techniques can also be employed to complement or provide additional measurements for determining the height of the tank roof.

For example, the roof of an EFR tank is supported from the center of the roof by an extended arm that is generally connected to a ladder, which, in turn, is supported on the outside of the tank wall. The ladder allows access to the roof of the tank for inspection and maintenance purposes. To determine or confirm of the height of the tank roof, the angle of inclination of the arm can be measured relative to a defined reference on the tank.

For another example, in determining the height of the roof of an EFR tank, shadows of a tank can be analyzed. Specifically, under certain natural sunlit conditions, shadows from the tank walls may be visible on the tank roof and on the ground. The area or other measure of the size of the crescent-shaped shadows which are cast from the tank wall onto the tank roof and/or the ground vary with the roof height. For tanks of equal size and illumination angle with respect to the sun's position, the area of the crescent-shaped shadow is smaller in the tank with the higher liquid level and larger in the tank with the lower liquid level. The ratio of the areas of the internally cast crescent-shaped shadow to the externally cast crescent-shaped shadow can be used to determine relative roof height of the two tanks.

With respect to tanks with fixed roofs (IFR), the liquid level within a selected tank can be ascertained from collected infrared images, as the temperature of the stored oil is different than that of the air above it in the tank. One preferred form of analysis to determine the height of the liquid level in the tank is to measure the pixel distance from the liquid-gas boundary to the base of the tank. Based on the ascertained liquid level within the tank and the volume capacity information and/or the physical dimensions of the selected tank stored in the database at the central processing facility, the amount of crude oil in the tank can again be calculated.

Once the analysis of each tank in a particular location is completed, the calculated amounts can then be communicated to market participants and other interested parties, i.e., third parties who would not ordinarily have ready access to such information about the amount of crude oil in storage at a given time. By summing the volumes in all of the tanks or in a grouping of selected tanks, information about the total amount of crude oil at the particular location or in the grouping of selected tanks (for example, tanks owned by a particular company or the amounts of crude oil of a certain type) can also be calculated and communicated to market participants and other interested parties. It is contemplated and preferred that such communication to third-party market participants could be achieved through electronic mail delivery and/or through export of the data to an access-controlled Internet web site, which third-party market participants can access through a common Internet browser program, such as Microsoft Internet Explorer®.

As a further refinement, in addition to calculating the amount of crude oil in each tank, a further analysis can be conducted to determine the frequency at which the storage level in each tank varies over time in order to allow a grouping or classification of tanks by their pattern of usage.

As a further refinement, directly-observed, third-party, or computed data, such as coefficient of variance of the storage level data, can be displayed to provide a visualization of the activity of one or more tanks at a particular location (i.e., a tank farm or storage hub).

An exemplary system for determining an amount of a liquid energy commodity stored in a tank in accordance with the present invention includes: (a) a tank information receiving module for receiving and processing tank information, including volume capacity information, storing such information in a database; (b) an image receiving module for receiving and processing images of one or more tanks, storing such images in a database; (c) an analysis module for querying the databases and analyzing the images of each tank to determine a liquid level for each tank; (d) a calculation module for calculating the amount of the liquid energy commodity in each tank based on the determined liquid level and the volume capacity information from the database; and (e) a communications module for communicating information about the liquid energy commodity to a third-party market participant.

DETAILED DESCRIPTION OF THE INVENTION

The present invention is a method and system for determining an amount of crude oil or similar liquid energy commodity that is stored in a particular location, such as tank farm or storage hub.

As discussed above, crude oil is typically stored in large, above-ground tanks. A tank has either: a floating roof, which is known as an external floating roof (EFR); or a fixed roof with a floating roof internal to the tank, which is known as an internal floating roof (IFR). For instance, in the United States, there is a large concentration of such crude oil tanks in tank farms located near Cushing, Okla., which makes this area a major trading hub for crude oil. The tank farms near Cushing, Okla. have a collective capacity in the range of 50 million barrels of crude oil. Similarly, other liquid energy commodities of interest, including natural gas liquid derivatives (or condensates) and refined petroleum products (such as diesel, gasoline, and fuels oils) may also be stored in such above-ground tanks.

Figure 1:
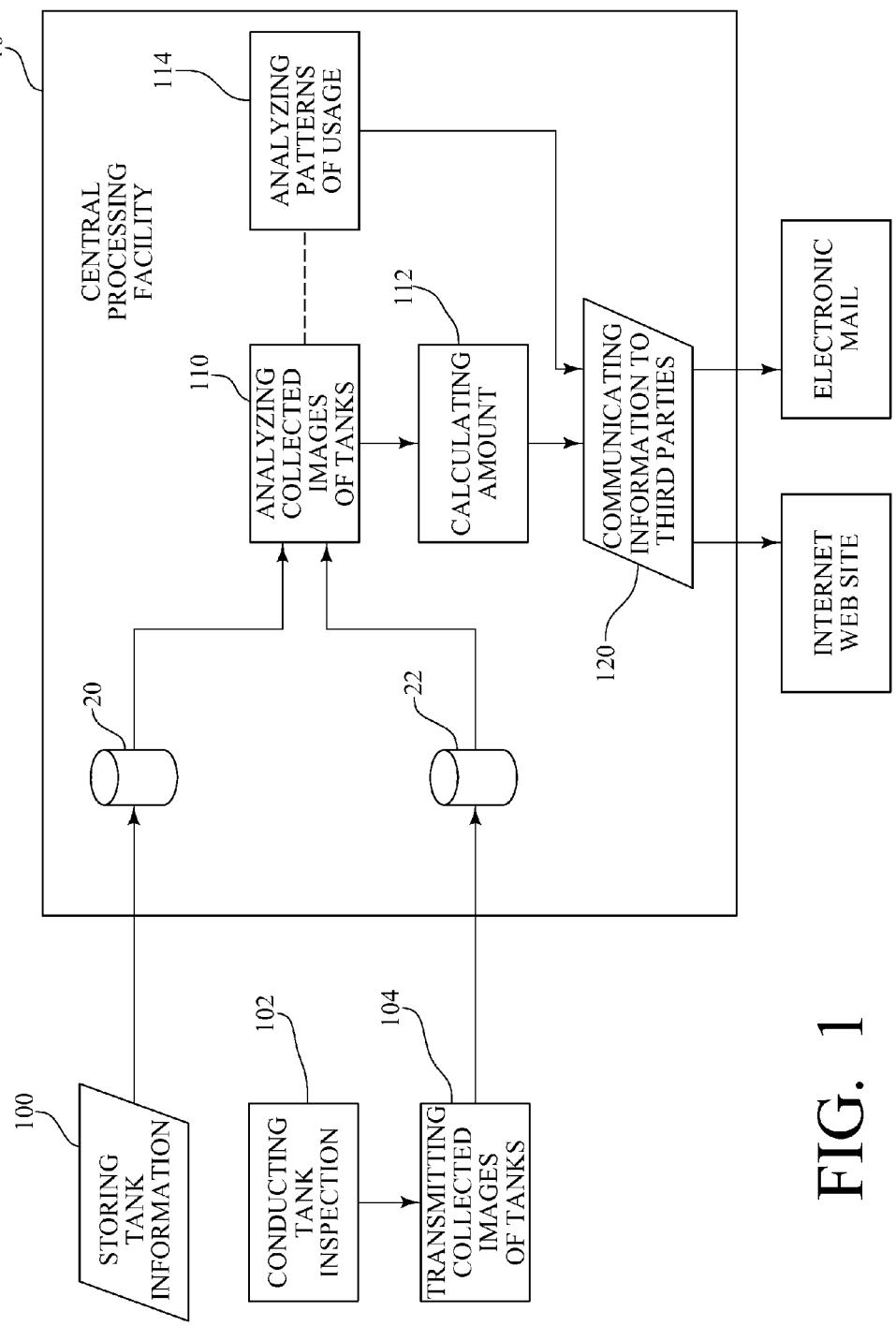
FIG. 1 is a flow chart depicting the general functionality of an exemplary implementation of the method and system of the present invention.

Referring now to FIG. 1, in accordance with the method and system of the present invention, each tank in a particular location is researched using publicly available resources or visual inspection, and all relevant information about each tank, including volume capacity information, tank type (i.e., floating roof or fixed roof), physical dimensions, emissions data and/or any other information contained in tank construction and safety permits, is stored in a database 20 at a central processing facility 10, as indicated by block 100. Furthermore, depending on the source and methods of their production, crude oils vary in chemical and physical properties and are typically classified by American Petroleum Institute gravity (or API number), which is a measure of how heavy or light a crude oil is relative to water. The API number or similar information about the type of crude oil stored in each tank may also be stored in the database.

On a predetermined schedule, an inspection of each tank at the particular location is conducted, as indicated by block 102 in the flow chart of FIG. 1. For example, such an inspection may be conducted via a helicopter that flies over the location. Such an inspection includes the collection of one or more photographic images (i.e., visible spectrum) or video of each tank, the collection of infrared images or video of each tank, and/or the collection of other types of images of each tank. In the case of an aerial image acquisition, such as a helicopter flyover, the helicopter preferably flies a defined and repeatable flight route and adheres to a pre-defined sequence for image acquisition, which facilitates the subsequent analysis. Furthermore, it should be also recognized and understood that image acquisition can be performed using a variety of other airborne or ground-based methods without departing from the spirit and scope of the present invention, including, but not limited, to, airplanes, unmanned aerial vehicles (UAV), remote-controlled aircraft, satellite imaging systems, and fixed cameras at ground level.

The collected images of each tank are then transmitted to a central processing facility 10 and stored in a database 22, as indicated by block 104 in the flow chart of FIG. 1. This database 22 may be separate from the database 20 described above, or the two databases 20, 22 may be integrated with one another. With respect to the transmission of the collected images, such transmission may be achieved through an Internet connection or any other data transmission technique, including, but not limited to, wireless communications, satellite communications, microwave communications, and/or a fiber optic link or similar landline transmission.

At the central processing facility, an analysis of the collected images is conducted, as indicated by block 110 in the flow chart of FIG. 1, which allows for a calculation of the amount of crude oil in each tank, as indicated by block 112 in the flow chart of FIG. 1.

As part of or prior to any such analysis of the collected images, as an initial step, it is necessary to identify each tank in the collected images. Accordingly, in one preferred implementation of the method and system of the present invention, each tank is assigned a unique identification number. Once the collected images are received at the central processing facility, the collected images are reviewed manually or using computer-aided image recognition software, and the tanks appearing in each image are tagged with the appropriate unique identification numbers. Tagging the tanks with unique identification numbers in this manner facilitates the entry and storage of the images in the database 22.

Figure 2:
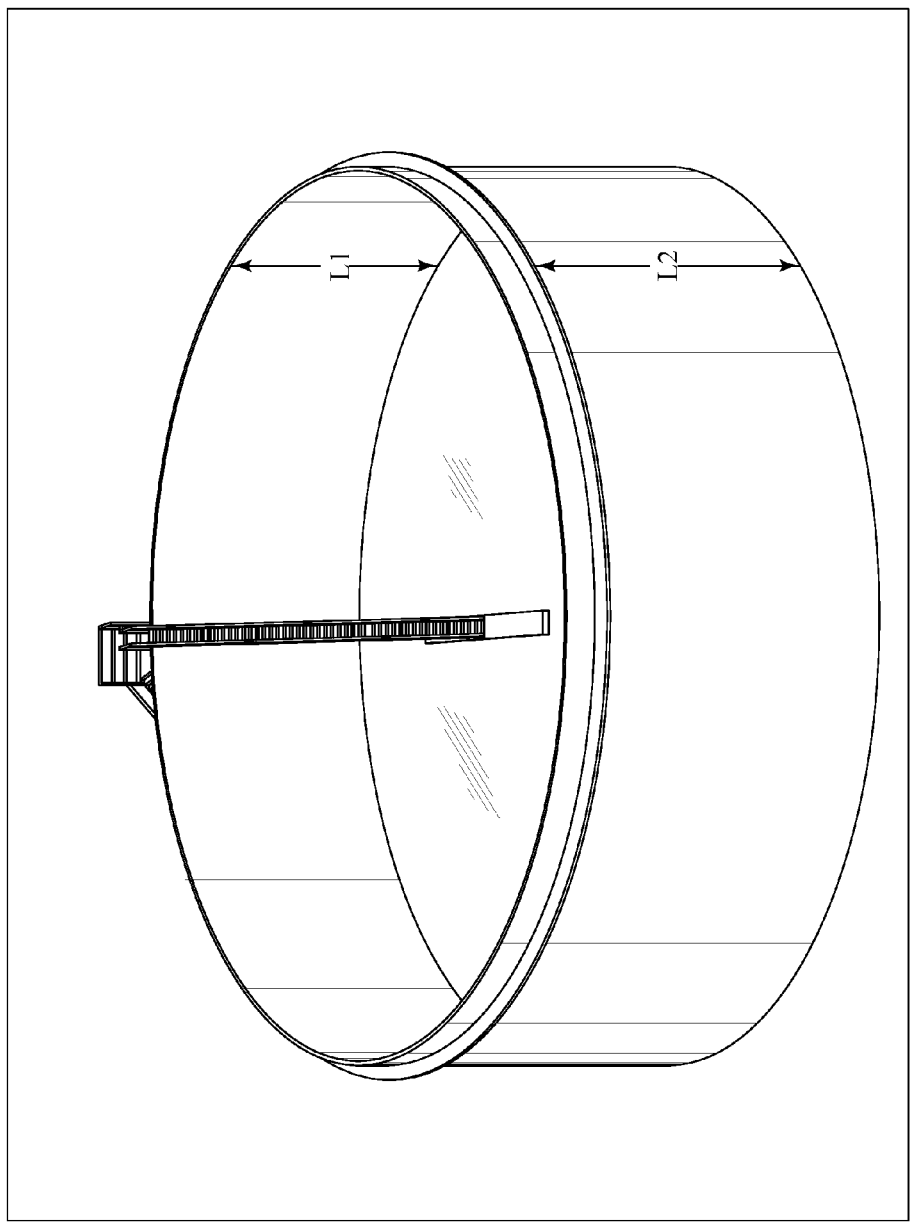
FIG. 2 is a representation of an aerial image of a tank with an external floating roof.

Referring again to the analysis of the collected images, with respect to the analysis of a tank with an external floating roof (EFR), one preferred form of analysis is to determine the height of the roof relative to the top of the selected tank using standard image pixel number determination techniques. For example, tank levels can be measured by drawing two vertical lines, such as L1 and L2, as shown in FIG. 2. When measuring tank levels for floating roof tanks, the L1 line is drawn on the inside of the tank from the top of the tank down to the top of the roof and approximates the height the roof has been lowered. The L2 line is drawn on the outside of the tank from the top of the tank down to the bottom of the tank and approximates the height of the tank. The respective lengths of the L1 and L2 lines are then measured. Such measurement is optimized, for example, by ensuring an appropriate camera angle and distance from the tank, using high-resolution equipment for image acquisition, and/or ensuring consistent and proper placement of the L1 and L2 lines on the image.

Based on the determined height of the roof (which is indicative of the liquid level) and the volume capacity information and/or the physical dimensions of the selected tank stored in the database 20 at the central processing facility 10, the amount of crude oil in the tank can be calculated. For example, if the roof is at the halfway point, i.e., at a 50% height relative to the top of a 200,000-barrel tank, and the tank has a typical cylindrical construction with a constant diameter from the base to the top, it is calculated that 100,000 barrels of crude oil are in the tank. Stated another way, tank level percent of capacity can be calculated by:

$$\text{Capacity} = 1 - (D1/D2) \tag{1}$$

where D1 and D2 are the respective measured lengths of L1 and L2 in image pixels. Tank level percent of capacity is then multiplied by the tank capacity to calculate the number of barrels of crude oil in the tank. Tank level percent of capacity computed in this manner represents an estimate of the capacity occupied by the oil being stored in the tank. This value can then be corrected for: estimates of the volume occupied for the physical roof itself; any oil volumes and residue at the bottom of the tank (which is also referred to as the "heel"), which is not considered unusable oil volume; and/or any empty volume at the top between the roof and the permitted level of liquid for prevention of tank overflow.

Figure 3:
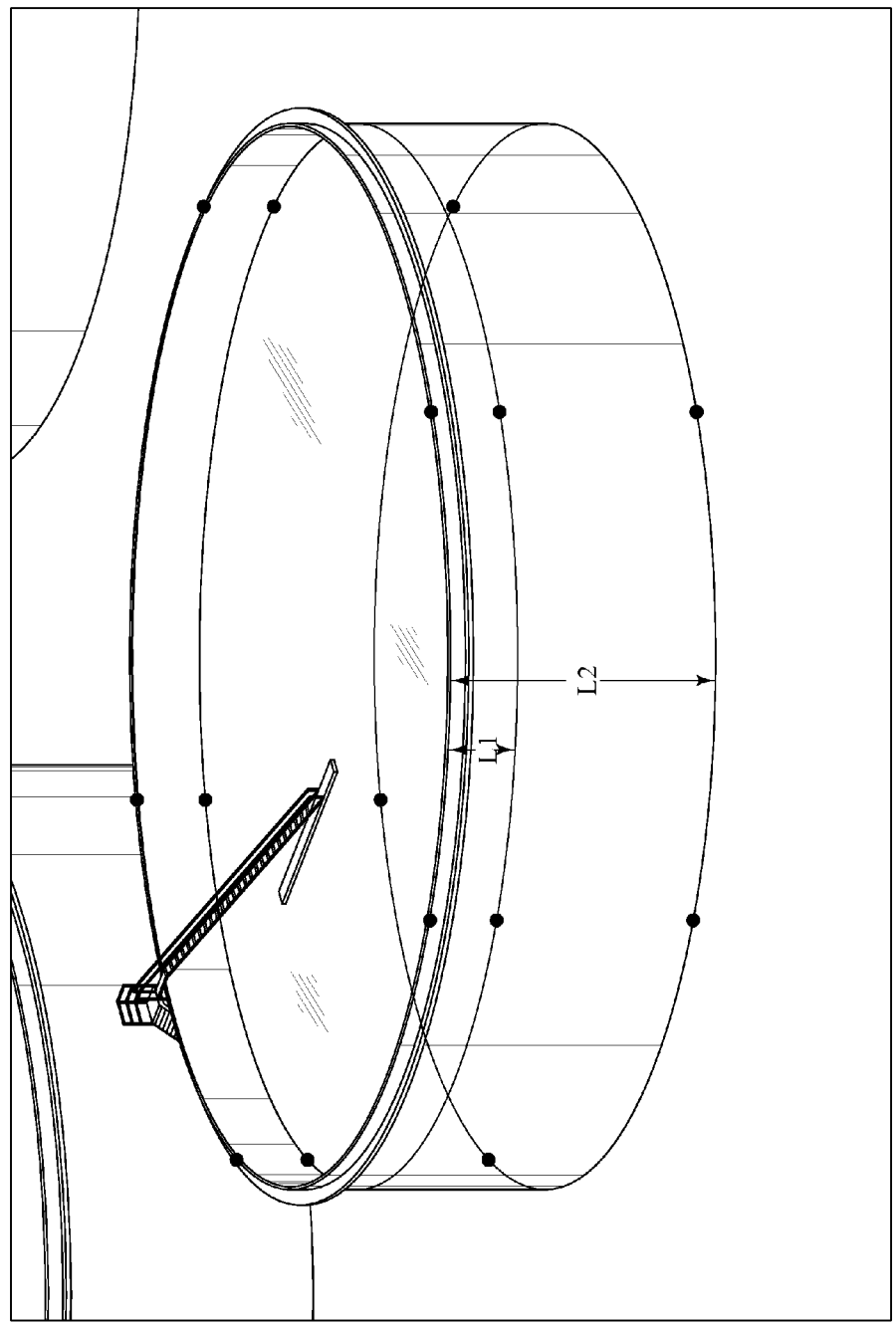
FIG. 3 is a representation of an aerial image of another tank with an external floating roof, and further illustrating the identification of elliptical boundaries corresponding to each of the top, roof, and base of the tank.

With respect to the analysis of a tank with an external floating roof (EFR), another preferred form of analysis is an image processing analysis to model the top, roof, and base of a tank as parallel elliptical planes and to determine the roof height by calculating the separation distance between these elliptical planes. One method for the extraction of known geometric features (e.g., circles, ellipses, etc.) in digital image processing is the use of the Hough transform. See, for example, K. Hahn, Y. Han, and H. Hahn, "Extraction of Partially Occluded Elliptical Objects by Modified Randomized Hough Transform," in Proc. KI, 2007, pp. 323-336, which is incorporated herein by reference. In a generalized implementation of the Hough transform for known geometrical feature extraction, the entire image is interrogated for location of a feature of interest. In this implementation, however, it is preferred that a selection is made by a user to provide initial starting points for the location of the three elliptical shapes of interest (top, roof, base), which decreases image processing time. For example, in computer software that implements the digital image processing, the user may be prompted to identify a set of points along the elliptical boundaries by pointing and clicking on the image displayed on a computer screen with a computer mouse. For example, as shown in FIG. 3, multiple points have been identified for each of the three elliptical shapes of interest (top, roof, base). Once the elliptical boundaries have been identified by the user, automated elliptical form detection algorithms employing a Hough transform (or other elliptical shape extraction algorithm) can then be used to fit the elliptical planes corresponding to each of the top, roof, and base of the tank, as also shown in FIG. 3. Based on the determined height of the roof relative to the base and/or the top of the tank (which again is indicative of the liquid level) and the volume capacity information and/or the physical dimensions of the selected tank stored in the database 20 at the central processing facility 10, the amount of crude oil in the tank again can be calculated.

In addition to the techniques for calculating the amount of crude oil described above, various other methods or techniques can be employed to complement or provide additional measurements for determining the height of the tank roof, which is indicative of the liquid level.

Figure 4:
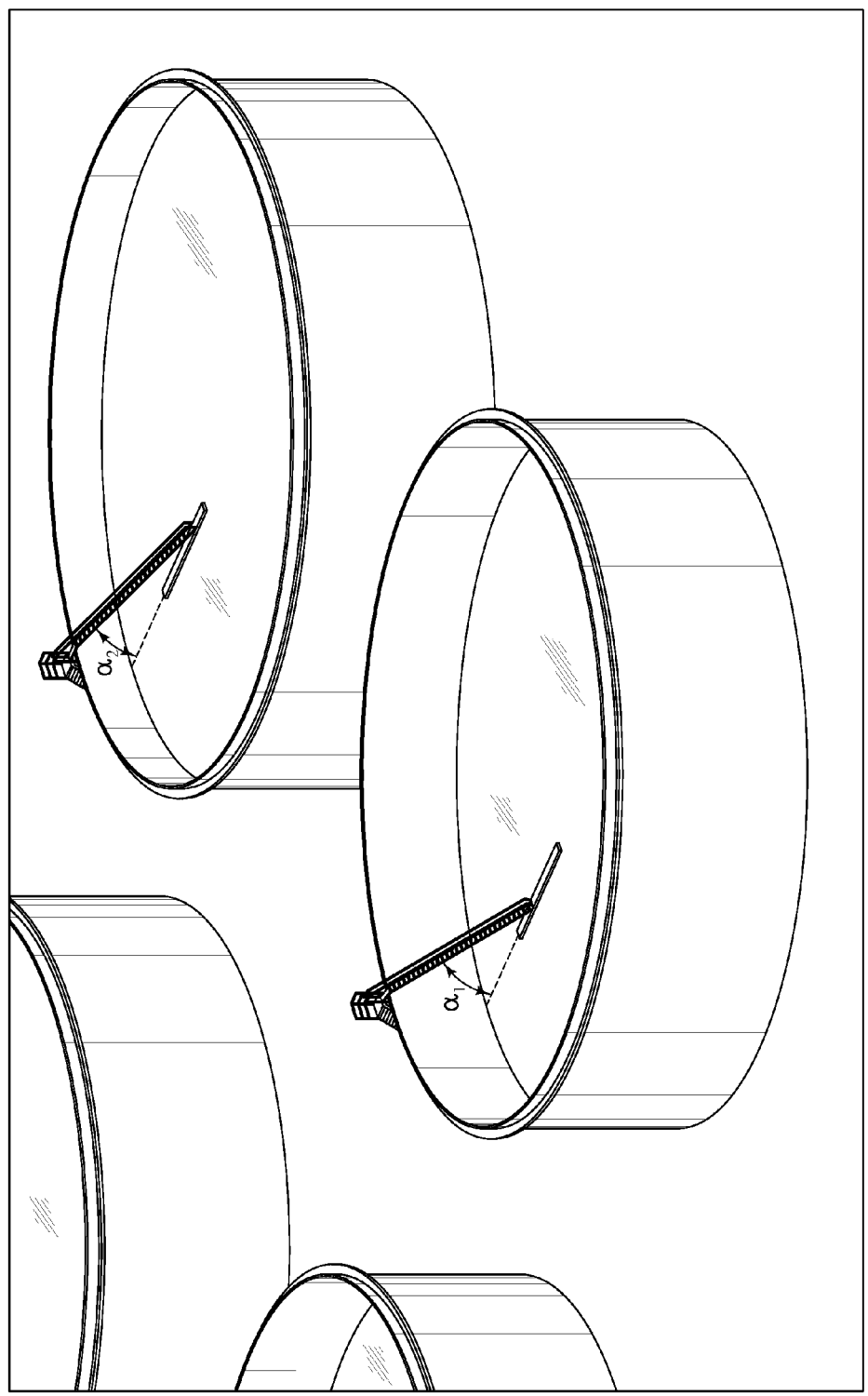
FIG. 4 is a representation of an aerial image of two adjacent tanks, each having an extended arm and ladder combination.

For example, the roof of an EFR tank is supported from the center of the roof by an extended arm that is generally connected to a ladder, which, in turn, is supported on the outside of the tank wall. The ladder allows access to the roof of the tank for inspection and maintenance purposes. FIG. 4 is a representation of an aerial image of two adjacent tanks, each having such an extended arm and ladder combination. To determine or confirm of the height of the tank roof, the angle of inclination ($\alpha_1$ or $\alpha_2$) of the arm can be measured relative to a defined reference on the tank.

Figure 5:
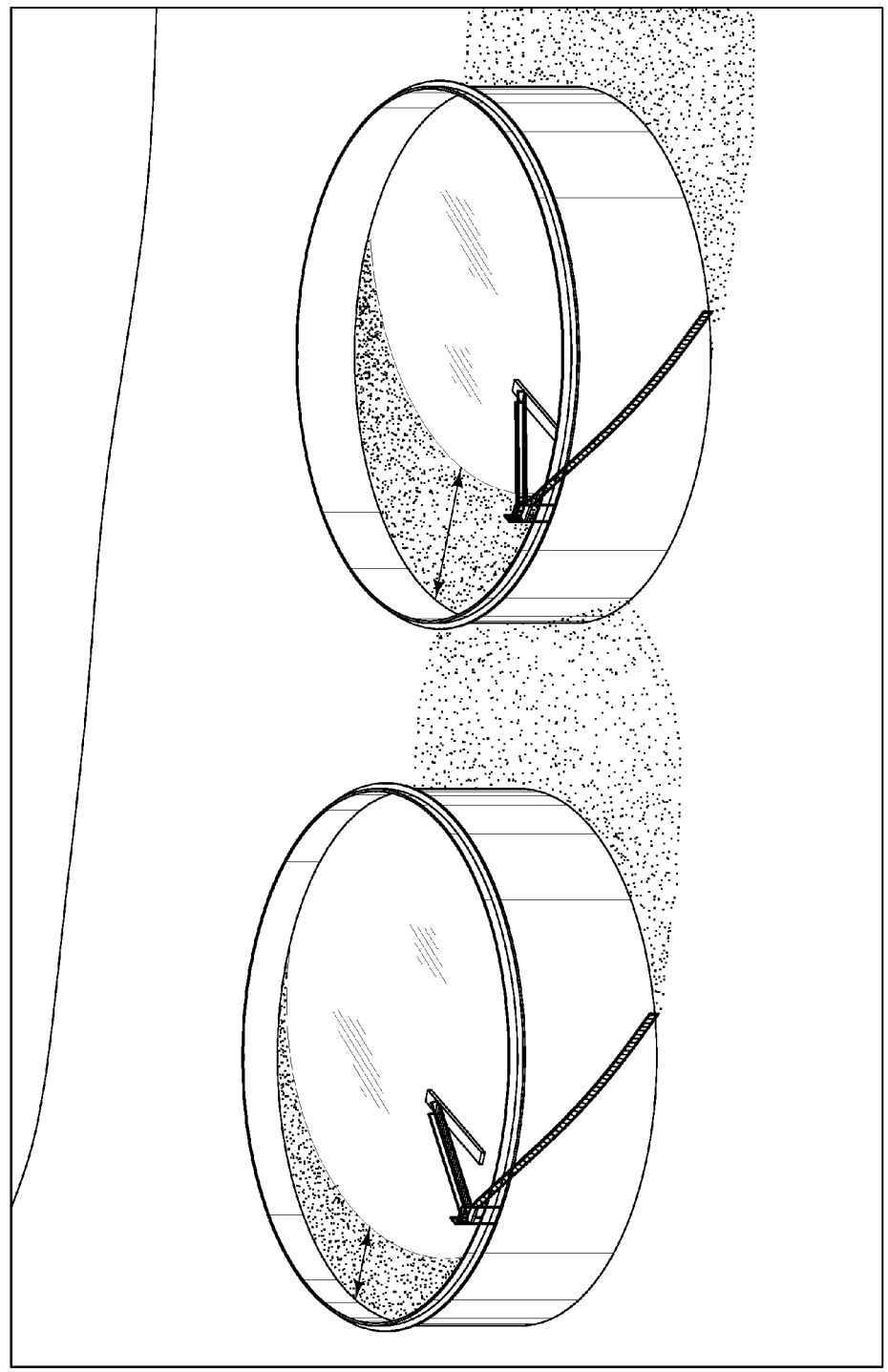
FIG. 5 is a representation of an aerial image of two tanks with different roof heights with their corresponding internal (on the tank roof) and external (on the ground) shadows visible.

For another example, in determining the height of the roof of an EFR tank, shadows of a tank can be analyzed. Specifically, under certain natural sunlit conditions, shadows from the tank walls may be visible on the tank roof and on the ground. The area or other measure of the size of the crescent-shaped shadows which are cast from the tank wall onto the tank roof and/or the ground vary with the roof height. FIG. 5 is a representation of an aerial image of two tanks with different roof heights with their corresponding internal (on the tank roof) and external (on the ground) shadows visible. For tanks of equal size and illumination angle with respect to the sun's position, the area of the crescent-shaped shadow is smaller in the tank with the higher liquid level and larger in the tank with the lower liquid level. The ratio of the areas of the internally cast crescent-shaped shadow to the externally cast crescent-shaped shadow can be used to determine relative roof height of the two tanks.

Figure 6:
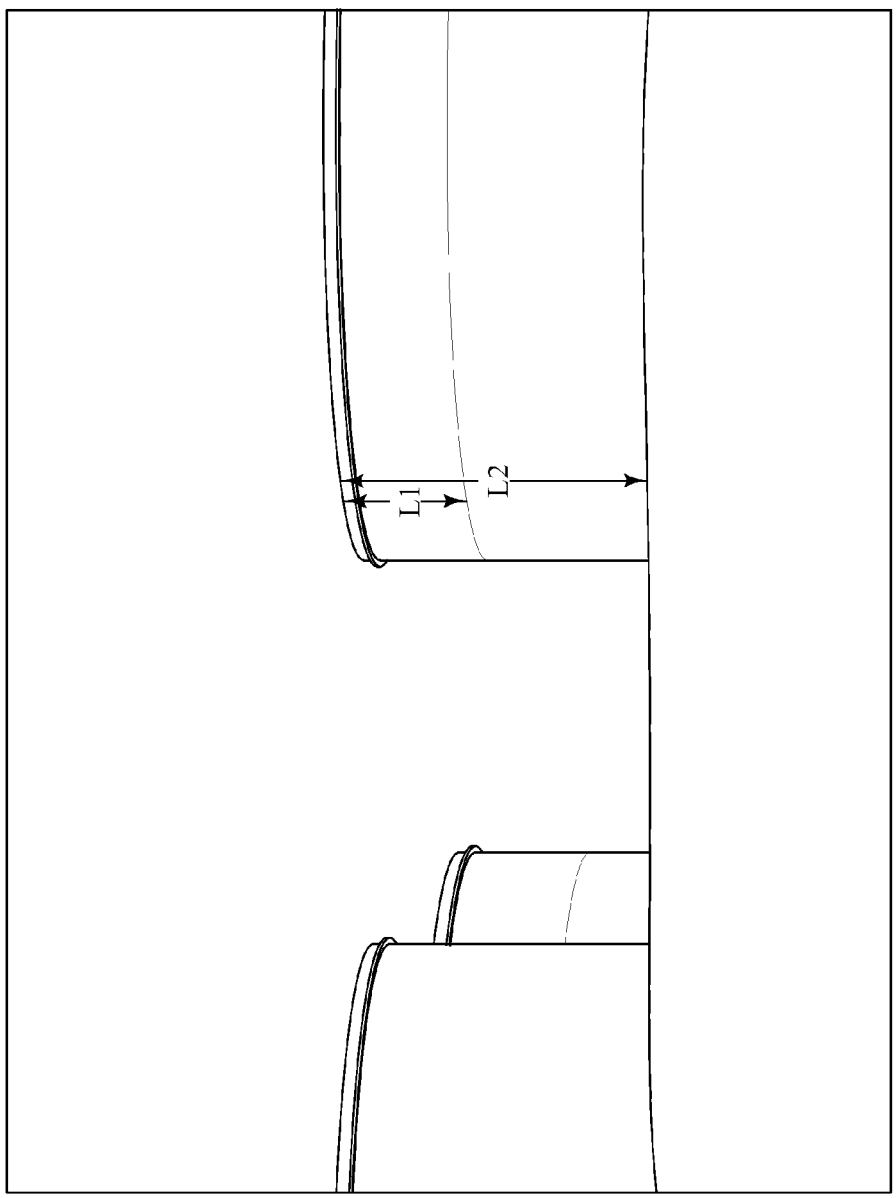
FIG. 6 is a representation of an infrared image of a tank with a fixed roof.

With respect to tanks with fixed roofs (IFR), the liquid level within a selected tank can be ascertained from collected infrared images, as shown in FIG. 6, as the temperature of the stored oil is different than that of the air above it in the tank. One preferred form of analysis to determine the height of the liquid level in the tank is to measure the pixel distance from the liquid-gas boundary to the base of the tank. Based on the ascertained liquid level within the tank and the volume capacity information and/or the physical dimensions of the selected tank stored in the database 20 at the central processing facility 10, the amount of crude oil in the tank can again be calculated.

Finally, it should be recognized and understood that infrared imaging and analysis may also be used in determining the liquid level within an EFR tank. Indeed, such infrared imaging and analysis may be particular useful when the roof of an EFR tank is fully collapsed to the floor of the tank. When the roof of an EFR tank is fully collapsed to the floor of the tank, there is a space (i.e., a fixed volume) between the roof and the floor of the tank. In some cases, there is an interest in determining whether some liquid is present in this space or whether it is free of any liquid as in the case of a newly constructed tank Infrared imaging and analysis allows for a determination as to whether this so-called liquid "bottom" exists.

Once the analysis of each tank in a particular location is completed, the calculated amounts can then be communicated to market participants and other interested parties, i.e., third parties who would not ordinarily have ready access to such information about the amount of crude oil in storage at a given time, as indicated by block 120 in the flow chart of FIG. 1. By summing the volumes in all of the tanks or in a grouping of selected tanks, information about the total amount of crude oil at the particular location or in the grouping of selected tanks (for example, tanks owned by a particular company or the amounts of crude oil of a certain type) can also be calculated and communicated to market participants and other interested parties. It is contemplated and preferred that such communication to third-party market participants could be achieved through electronic mail delivery and/or through export of the data to an access-controlled Internet web site, which third-party market participants can access through a common Internet browser program, such as Microsoft Internet Explorer®. Of course, communication of information and data to third-party market participants may also be accomplished through a wide variety of other known communications media without departing from the spirit and scope of the present invention.

Referring again to FIG. 1, as a further refinement, in addition to calculating the amount of crude oil in each tank, a further analysis can be conducted to determine the frequency at which the storage level in each tank varies over time in order to allow a grouping or classification of tanks by their pattern of usage, as indicated by block 114 in FIG. 1.

Figure 7A:
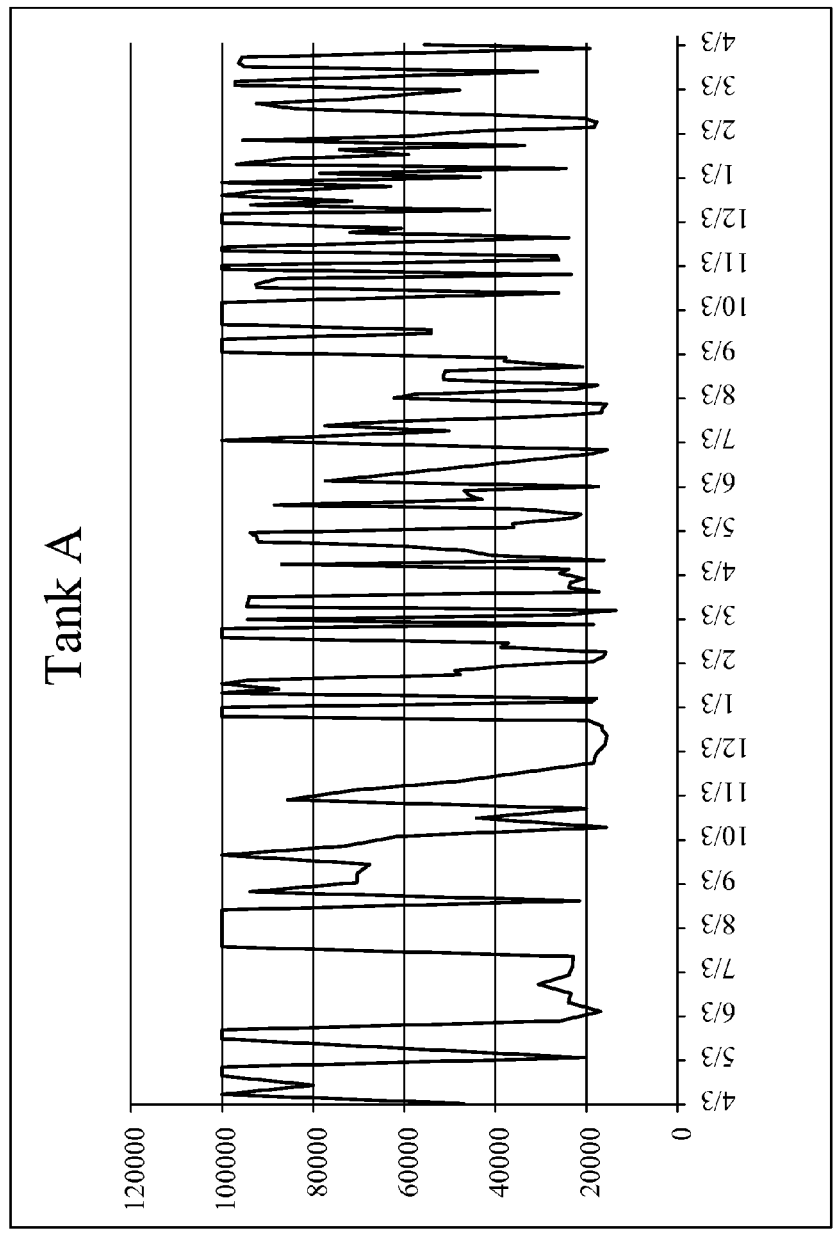
FIGS. 7A and 7B are exemplary plots showing the variation of storage level for two different tanks over time.
Figure 7B:
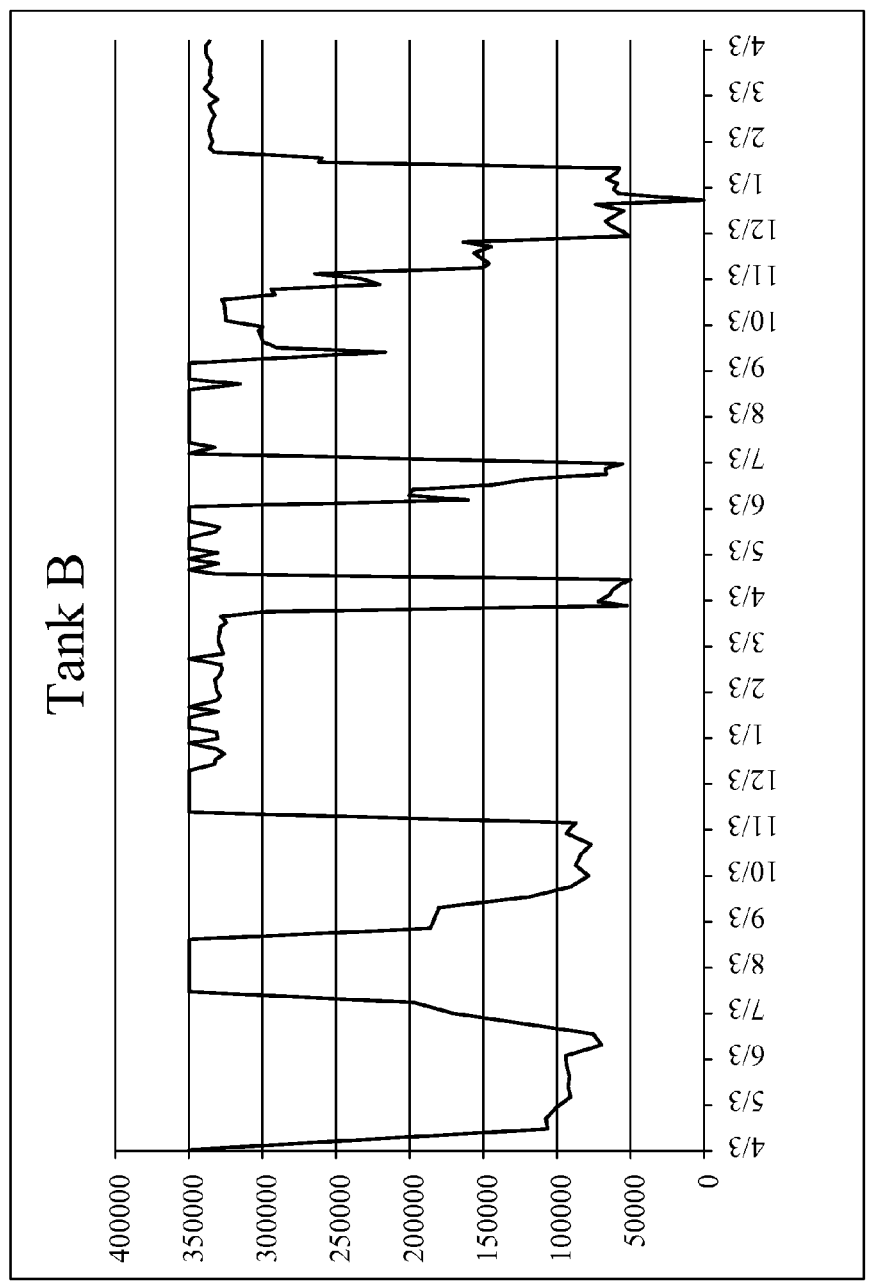

For example, one preferred method that can be used to determine the frequency at which the storage level in each tank varies over time is to compute a coefficient of variance of the storage level data. The coefficient of variance is defined as the standard deviation ($\sigma$) divided by the average value ($|\mu|$). FIGS. 7A and 7B are exemplary plots showing the variation of storage level for two different tanks, Tank A and Tank B, over time. A coefficient of variance ($c_v$) for each tank can be computed as follows:

$$c_v = \frac{\sigma}{|\mu|} \quad (2)$$

With respect to the exemplary plots of FIGS. 7A and 7B, the computed coefficient of variance ($c_v$) for Tank A is 0.50, while the computed coefficient of variance ($c_v$) for Tank B is 0.30. Accordingly, Tank A is representative of a tank in which the storage level shows a high degree of variability over time, while Tank B is representative of a tank in which the storage level shows a low degree of variability over time.

Storage level variability analysis provides insight into operator usage and is often relevant to market participants. For example, for a tank operator who uses tanks to store crude oil for delivery on a fixed schedule to a refinery for processing, the variance analysis should demonstrate a fixed (or regular) frequency of filling and emptying, which corresponds to periodic purchasing and delivery schedules to the refinery. On the other hand, for a tank operator who purchases crude oil in order to store it until the price of crude oil increases at some future point in time, or otherwise uses the tank as a means of storing oil for long-term, speculative investment, the variance analysis should demonstrate that as well, as the operator will be filling and emptying the tank on an irregular basis, filling the tank when the price of crude oil is low and emptying the tank when the price of crude oil is high.

Furthermore, by computing the coefficient of variance for a number of tanks in a collection of above-ground tanks at a particular location (i.e., a tank farm or storage hub), each tank in that particular location can be classified by the variability of its storage level. For example, tanks at a particular location (i.e., a tank farm or storage hub) can be generally classified into two groups based on such a variance analysis: (a) "operational" tanks, wherein the coefficient of variance is greater than or equal to 0.4; and (2) "speculative" tanks, wherein the coefficient of variance is less than 0.4.

Variance analysis is but one example of how tank classifications can be performed. Other tank classification may include classifying tanks by physically observed characteristics of the tank from the image acquisition described above, such as: tank volume (derived from measured height and diameter); type of crude oil or liquid energy commodity stored; physical location relative to incoming and outgoing delivery and receipt pipelines; and tank infrastructure (e.g., tank vents, tank mixers, tank pipeline configuration, tank roof type). Classification can also be performed based on non-observable third-party tank data, such as tank age, tank permitting status, tank emissions, and so on. Third-party data of this type is generally available from local, state or federal level organizations responsible for tank construction, emissions, and environmental permitting relating to hazardous and non-hazardous liquids storage.

As a further refinement, directly-observed, third-party, or computed data, such as the coefficient of variance of the storage level data, can be displayed to provide a visualization of the activity of one or more tanks at a particular location (i.e., a tank farm or storage hub).

Figure 8:
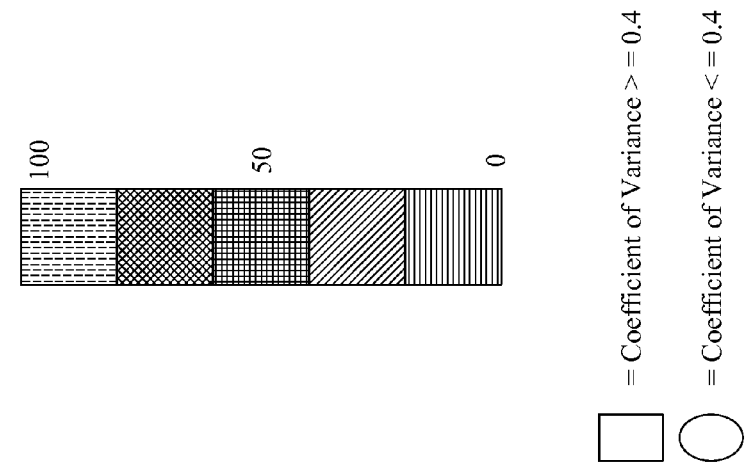
FIG. 8 is an exemplary visualization of selected tanks at a particular location, with each tank displayed as a cell on a two-dimensional heat map.
Figure 8:
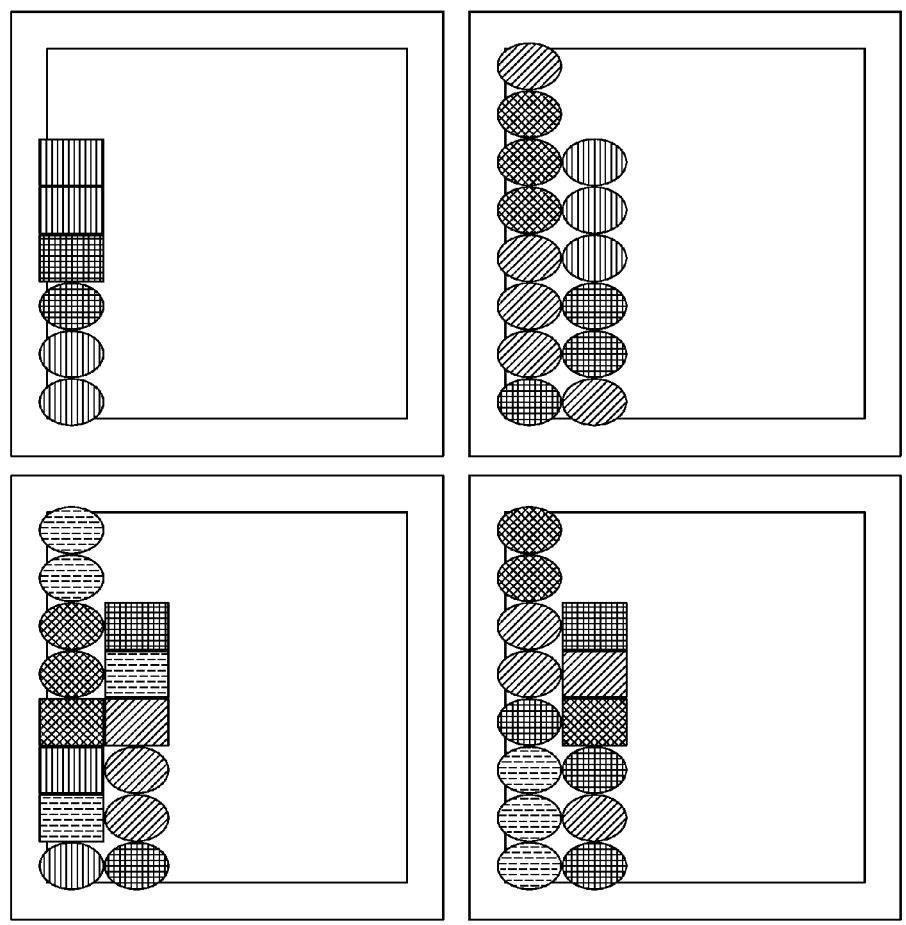

FIG. 8 is an exemplary visualization of selected tanks at a particular location. As shown in FIG. 8, each tank is displayed as a "cell" on a two-dimensional "heat map." In this example, the shape of each cell is indicative of whether the tank is operational (where the coefficient of variance over a given time period is greater than or equal to 0.4) or speculative (where the coefficient of variance over a given time period is less than 0.4). Specifically, operational tanks are represented by a cell having an oval shape, while speculative tanks are represented by a cell having a rectangular shape. Furthermore, each cell is color-coded to correspond to the amount of change (percentage) in the volume of crude oil stored in the tank as compared to a prior time period (e.g., prior week). Finally, cells are grouped and placed in boxes that correspond to a particular owner and/or operator of the tanks represented by those cells.

Of course, although not shown in FIG. 8, the tanks could be placed in boxes or other clusters based on other criteria, such as all operational tanks in one box and all speculative tanks in another box. Thus, this visualization of the operational status of the tanks at a particular location provides a viewer with ready indication of which tanks are active and when each tank begins to build or withdraw crude oil from storage. A viewer can also readily ascertain whether there are similar changes occurring across all or an appreciable number of the tanks of a particular owner and/or operator, or among all operational tanks or all speculative tanks.

Furthermore, the "heat map" display of FIG. 8 could also be matched and displayed with external market parameters, such how the price of crude oil for delivery in future months varies relative to the price of crude oil for immediate delivery. The terminology used in the market terms crude oil contracts for delivery of crude oil in the future as "forward" month contracts. The rise or fall defined by the slope in the price curve for the first four forward months is defined as the nearby contango (a rising curve where the price of crude oil for future delivery is higher than that for immediate delivery) or backwardation (a falling curve where the price of crude oil for future delivery is lower than that for immediate delivery).

Also, an alternative method of organization of tanks in the "heat map" shown in FIG. 8 would be to allow groups of tanks to "self-organize" based on parameters derived from the tank data or external data sources. For example, tanks filling or emptying (which can be associated with simultaneous increases in incoming or outgoing pipeline flow) may provide a means of identifying which tanks in a storage hub are serviced by which incoming and outgoing pipelines. For another example, tank emptying and fill activity without a corresponding match in activity levels in incoming and outgoing pipelines may indicate inter-tank farm transfers from one tank owner to another at a particular location.

With respect to FIG. 8, to the extent that it is possible to collect substantially real-time images of the tanks at a particular location, the "heat map" could be updated in substantially real-time, thus providing a current visualization of the activity at a particular location to market participants and/or the owners/operators of the tanks.

Finally, the "heat map" of FIG. 8 is but one manner of visualization of selected tanks at a particular location. Various other techniques aside from color coding, including icons or other graphical representations, could be used to provide the desired visualization without departing from the spirit and scope of the present invention.

Figure 1A:
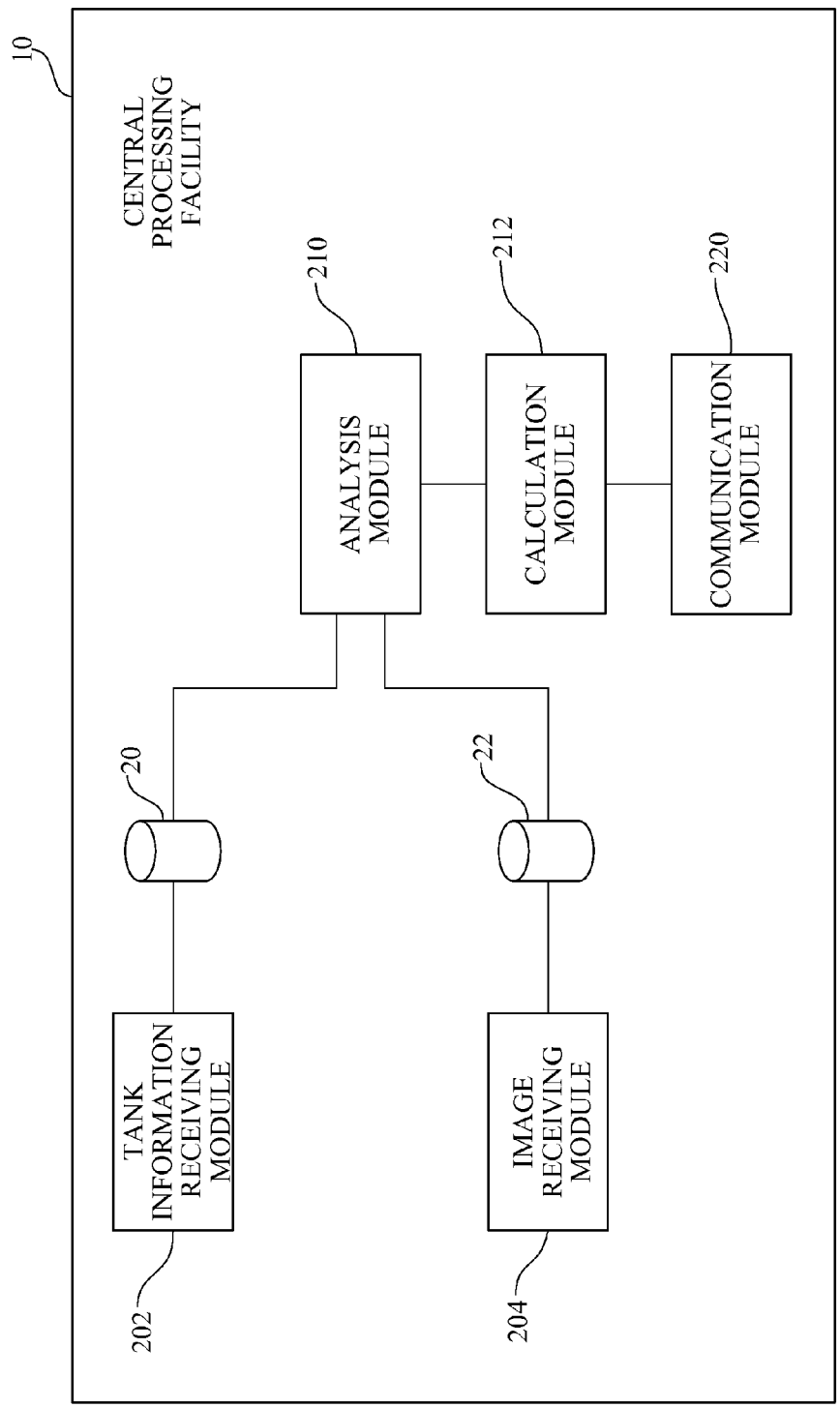
FIG. 1A is a schematic representation of the core components in the exemplary implementation of FIG. 1.

Referring now to the schematic representation of the core components in FIG. 1A, the central processing facility 10 includes the above-described databases 20, 22. Furthermore, the central processing facility 10 hosts a digital computer program (i.e., computer-readable instructions stored and executed by a computer) that includes appropriate modules for executing the requisite instructions for performing the operational steps of the method described above. Thus, an exemplary system for determining an amount of a liquid energy commodity stored in a tank in accordance with the present invention includes: (a) a tank information receiving module 202 for receiving and processing tank information, including volume capacity information, storing such information in the database 20; (b) an image receiving module 204 for receiving and processing images of one or more tanks, storing such images in the database 22; (c) an analysis module 210 for querying the databases 20, 22 and analyzing the images of each tank to determine a liquid level for each tank; (d) a calculation module 212 for calculating the amount of the liquid energy commodity in each tank based on the determined liquid level and the volume capacity information from the database 20; and (e) a communications module 220 for communicating information about the liquid energy commodity to a third-party market participant.

As a further refinement, in order to monitor inflows and outflows into or from a particular location, and in order to determine the mass balance of the storage facility and, hence, the net increase or decrease in storage levels at the location (such as the aforementioned tank farms near Cushing, Okla.), it is contemplated that power consumption estimations could be made for each pumping station or pumping manifold associated with a particular location and/or associated with pipelines feeding oil into the location and carrying oil away from the location. Power at a storage location is primarily used to operate pumps controlling flow of oil into and out of the location, powering metering and control devices at the location, and powering electric mixers used for blending and mixing for individual tanks Power consumption could be estimated, for example, by using the techniques described in commonly assigned U.S. Pat. No. 6,771,058 entitled "Apparatus and Method for the Measurement and Monitoring of Electrical Power Generation and Transmission" or U.S. Pat. No. 6,956,364 entitled "Apparatus and Method for Monitoring Power and Current Flow." Each of these patents is incorporated herein by reference. Once the estimated power consumption for a pumping station or pumping manifold is known, that data can be correlated to a prediction of the rate of oil flowing through that pumping station, and, therefore, the rate of oil flowing on the pipeline for which the pump station is associated. Thus, once an initial calculation of the total amount of crude oil at the particular location has been made, monitoring the power consumption, and thus the inflows and outflows into or from the particular location, would allow for a continuous real-time determination of the amount of crude oil at the particular location.

As a further refinement, in addition to determining the amount of oil stored in various tanks, the above-described methodology may be used to determine the inflow and outflow of certain types of crude oil into a particular location, such as the aforementioned tank farms near Cushing, Okla. Pipelines flowing oil into and out of the location can carry different types of crude oil. These crude oil types will be stored in different tanks at the location depending on their composition and factors such as whether they are to be blended with other oils. An analysis of what pipelines are pumping and what owners and tanks are receiving certain types of crude oil can be made. Certain tanks at a particular location will be used for long-term storage, some for blending different types of crude oil, and some for operational pressure controls on pipeline flowing into and out of the location.

As a further refinement, in addition to determining the amount of oil stored at a particular location, such as the aforementioned tank farms near Cushing, Okla., imaging and storage level determination of additional tank farms to determine what oil is available to flow by pipeline into a particular storage location from a source location upstream. By identifying the level of oil (by visual or infrared imaging) stored in tanks at the upstream location, the effects of these levels on the increase or decrease of storage levels at the destination storage location can be determined. Oil flow by pipeline typically ranges from 3 to 5 miles per hour, so there is a delay between emptying of a tank at an upstream location and the arrival and filling of oil at a destination storage location.

As a further refinement, it is also contemplated that infrared imaging of oil refineries can be used to determined if and when major refining units are down, which impacts the outflows of stored crude oil. By identifying that one or more major refining units are down, it can be presumed that storage levels in the associated tank farms will rise, and accordingly, such infrared imaging of oil refineries can be used to confirm that calculated storage amounts are trending in a manner consistent with refinery activity.

As a further refinement, in addition to determining the amount of oil stored at a particular location, such as the aforementioned tank farms near Cushing, Okla., based on historic imaging data and an assessment of the stage of the construction, estimations can be made in the case of new tank construction as to the duration before tanks become operational at the location. Specifically, stages of tank construction (initial foundation, tank wall construction, tank roof construction, hydrotesting, completion, etc.) can be classified from visual and infrared images, and a time series of construction progress can be tracked. Likewise, such an analysis can be done for tank inspections and tank decommissioning.

One of ordinary skill in the art will recognize that additional implementations are also possible without departing from the teachings of the present invention. This detailed description, and particularly the specific details of the implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for determining an amount of a liquid energy commodity stored in a particular location, comprising the steps of:
    storing volume capacity information associated with each tank at the particular location in a database;
    periodically conducting an inspection of each tank at the particular location from a remote vantage point and without direct access to each tank, including collecting one or more images of each tank;
    transmitting the collected images of each tank to a central processing facility;
    analyzing the collected images of each tank to determine a liquid level for each tank;
    calculating the amount of the liquid energy commodity in each tank based on the determined liquid level and the volume capacity information retrieved from the database; and
    communicating information about the amount of the liquid energy commodity at the particular location to a third-party market participant.

2. The method as recited in claim 1, in which the collected images include photographic images.

3. The method as recited in claim 1, in which the collected images include infrared images.

4. The method as recited in claim 2, in which the collected images include infrared images.

5. The method as recited in claim 1, in which the liquid energy commodity is crude oil.

6. The method as recited in claim 1, in which the liquid energy commodity is selected from the group consisting of crude oil, natural gas liquid derivatives, and refined petroleum products.

7. The method as recited in claim 1, in which communicating the information about the amount of the liquid energy commodity at the particular location includes exporting the information to an Internet web site accessible by the third-party market participant.

8. A method for determining an amount of a liquid energy commodity stored in a tank with an external floating roof, comprising the steps of:
    receiving, at a central processing facility, volume capacity information associated with the tank and storing the volume capacity information in a database;
    receiving, at the central processing facility, one or more images of the tank;
    analyzing the one or more images of the tank to determine a liquid level for the tank, including a determination of a height of the external floating roof of the tank relative to a top of the tank;
    calculating the amount of the liquid energy commodity in the tank based on the determined liquid level and the volume capacity information retrieved from the database; and
    communicating information about the amount of the liquid energy commodity in the tank to a third-party market participant.

9. The method as recited in claim 8, wherein the determination of the height of the roof of the tank relative to the top of the tank includes modeling the top, the roof, and a base of the tank as parallel elliptical planes.

10. The method as recited in claim 8, wherein the tank has an arm that extends between the roof and a wall of the tank, and wherein the determination of the height of the roof of the tank relative to the top of the tank includes measuring an angle of inclination of the arm.

11. The method as recited in claim 8, wherein the determination of the height of the roof of the tank relative to the top of the tank includes an analysis of one or more shadows generated by the tank.

12. A method for determining an amount of a liquid energy commodity stored in a tank with a fixed roof, comprising the steps of:
    periodically conducting an inspection of the tank from a remote vantage point and without direct access to the tank, including collecting one or more images of the tank;
    receiving, at a central processing facility, volume capacity information associated with the tank and storing the volume capacity information in a database;
    receiving, at the central processing facility, the one or more images of the tank from the inspection;
    analyzing the one or more images of the tank to determine a liquid level for the tank, including a determination of a height of a liquid level within the tank relative to a top of the tank based on the one or more images of the tank;
    calculating the amount of the liquid energy commodity in the tank based on the determined liquid level and the volume capacity information retrieved from the database; and
    communicating information about the amount of the liquid energy commodity in the tank to a third-party market participant.

13. A method for analyzing usage of one or more tanks used for storage of a liquid energy commodity at a particular location, comprising the steps of:
    storing volume capacity information associated with each tank at the particular location in a database;
    periodically conducting an inspection of each tank at the particular location, including collecting one or more images of each tank;
    transmitting the collected images of each tank to a central processing facility;
    analyzing the collected images of each tank to determine a liquid level for each tank;

calculating an amount of the liquid energy commodity in each tank based on the determined liquid level and the volume capacity information retrieved from the database;

conducting a further analysis based on the determined liquid level and the volume capacity information retrieved from the database to determine a frequency at which the liquid level in each tank varies over time; and communicating information about the amount of the liquid energy commodity in each tank and the frequency at which the liquid level in each tank varies over time to a third-party market participant.

14. The method as recited in claim 13, and further comprising the step of classifying each tank based on the frequency at which the liquid level in each tank varies over time, and then communicating that classification to the third-party market participant.

15. The method as recited in claim 13, wherein the further analysis to determine the frequency at which the liquid level in each tank varies over time includes a computation of a coefficient of variance.

16. The method as recited in claim 14, wherein the further analysis to determine the frequency at which the liquid level in each tank varies over time includes a computation of a coefficient of variance, and wherein a selected tank is classified as operational when the coefficient of variance is greater than or equal to 0.4 and classified as speculative when the coefficient of variance is less than 0.4.

17. The method as recited in claim 16, in which communicating the information about the frequency at which the liquid level in each tank varies over time to the third-party market participant includes a visualization indicating whether each tank is operational or speculative.

18. A method for determining an amount of crude oil stored in a particular location, comprising the steps of:

storing volume capacity information associated with each tank at the particular location in a database;

periodically conducting an inspection of each tank at the particular location from a remote vantage point and without direct access to each tank, including collecting one or more images of each tank;

transmitting the collected images of each tank to a central processing facility;

analyzing the collected images of each tank to determine a liquid level for each tank;

calculating the amount of crude oil in each tank based on the determined liquid level and the volume capacity information retrieved from the database; and communicating information about the amount of crude oil at the particular location to a third-party market participant.

19. The method as recited in claim 1, wherein the remote vantage point is an aerial vantage point.

20. The method as recited in claim 18, wherein the remote vantage point is an aerial vantage point.

21. The method as recited in claim 8, in which the images include photographic images, infrared images, or both photographic images and infrared images.

22. The method as recited in claim 8, in which the liquid energy commodity is selected from the group consisting of crude oil, natural gas liquid derivatives, and refined petroleum products.

23. The method as recited in claim 12, in which the images include photographic images, infrared images, or both photographic images and infrared images.

24. The method as recited in claim 12, in which the liquid energy commodity is selected from the group consisting of crude oil, natural gas liquid derivatives, and refined petroleum products.

25. The method as recited in claim 13, in which the images include photographic images, infrared images, or both photographic images and infrared images.

26. The method as recited in claim 13, in which the liquid energy commodity is selected from the group consisting of crude oil, natural gas liquid derivatives, and refined petroleum products.

27. A method for determining an amount of a liquid energy commodity stored in a particular location, comprising the steps of:

storing volume capacity information associated with each tank at the particular location in a database;

periodically conducting an inspection of each tank at the particular location, including collecting one or more images of each tank via a satellite imaging system;

transmitting the collected images of each tank from the satellite imaging system to a central processing facility;

analyzing the collected images of each tank to determine a liquid level for each tank;

calculating the amount of the liquid energy commodity in each tank based on the determined liquid level and the volume capacity information retrieved from the database; and communicating information about the amount of the liquid energy commodity at the particular location to a third-party market participant.

28. The method as recited in claim 8, wherein the one or more images of each tank are received from a satellite imaging system.

29. A method for determining an amount of a liquid energy commodity stored in a tank with a fixed roof, comprising the steps of:

receiving, at a central processing facility, volume capacity information associated with the tank and storing the volume capacity information in a database;

receiving, at the central processing facility, one or more images of the tank, wherein the one or more images of each tank are received from a satellite imaging systems;

analyzing the one or more images of the tank to determine a liquid level for the tank, including a determination of a height of a liquid level within the tank relative to a top of the tank based on the one or more images of the tank;

calculating the amount of the liquid energy commodity in the tank based on the determined liquid level and the volume capacity information retrieved from the database; and communicating information about the amount of the liquid energy commodity in the tank to a third-party market participant.

30. The method as recited in claim 12, wherein the remote vantage point is an aerial vantage point.

* * * * *